(12) United States Patent
Borgia et al.

(10) Patent No.: US 9,359,933 B2
(45) Date of Patent: Jun. 7, 2016

(54) THERMOSTATIC VALVE ASSEMBLY

(75) Inventors: Luca Borgia, Turin (IT); Carmine Pezzella, Turin (IT)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 803 days.

(21) Appl. No.: 13/591,438

(22) Filed: Aug. 22, 2012

(65) Prior Publication Data
US 2013/0048741 A1 Feb. 28, 2013

(30) Foreign Application Priority Data

Aug. 23, 2011 (GB) .................................. 1115035.6

(51) Int. Cl.
*F01P 7/02* (2006.01)
*F01P 7/16* (2006.01)
*G05D 23/13* (2006.01)

(52) U.S. Cl.
CPC .............. *F01P 7/16* (2013.01); *G05D 23/1333* (2013.01)

(58) Field of Classification Search
CPC ............ F01M 5/007; F01P 7/026; F01P 7/14; F01P 7/16; F16K 17/383; F16K 31/002; F16H 57/0412; F16H 57/0413; F28F 27/02; F28F 2250/06; G05D 23/022; G05D 23/123; G05D 23/132; G05D 23/1333; G05D 23/136; G05D 23/1393
USPC ............ 165/103, 297, 298, 916; 251/31, 322; 236/34.5, 40, 93 A, 99 K, 99 J, 99 R
See application file for complete search history.

(56) References Cited

U.S. PATENT DOCUMENTS

| | | | | |
|---|---|---|---|---|
| 4,288,031 A | * | 9/1981 | Hass | 236/34.5 |
| 4,580,531 A | * | 4/1986 | N'Guyen | 123/41.1 |
| 4,679,530 A | * | 7/1987 | Kuze | 123/41.1 |
| 5,385,296 A | * | 1/1995 | Kurz et al. | 236/34.5 |
| 5,482,010 A | * | 1/1996 | Lemberger et al. | 123/41.1 |
| 5,755,283 A | * | 5/1998 | Yates et al. | 165/297 |
| 5,967,101 A | * | 10/1999 | Roth et al. | 123/41.29 |
| 5,979,778 A | * | 11/1999 | Saur | 236/34.5 |

(Continued)

FOREIGN PATENT DOCUMENTS

GB 2476073 A 6/2011

OTHER PUBLICATIONS

China Patent Office, China Office Action for China Application No. 201210303216.6, dated Oct. 10, 2015.

*Primary Examiner* — Marc Norman
*Assistant Examiner* — Paolo Gonzalez
(74) *Attorney, Agent, or Firm* — Ingrassia Fisher & Lorenz PC

(57) ABSTRACT

A thermostatic valve assembly for a cooling system of an internal combustion engine provided with a radiator is provided. The thermostatic valve assembly includes a valve body having an inlet from the radiator, an inlet from the engine and an outlet to the engine. A main valve plate opens and closes the pathway of a cooling fluid from the radiator. A wax element is placed in a chamber of the valve body in fluid communication with the inlets and the outlet. The wax element has a piston mechanically connected to the main valve plate at a distal end. A main spring keeps the main valve plate closed until a target temperature of the cooling fluid coming from the engine is reached. An auxiliary valve plate opens and closes a direct pathway of the cooling fluid from the radiator to the chamber in which the wax element is placed.

14 Claims, 3 Drawing Sheets

(56) References Cited

U.S. PATENT DOCUMENTS

| | | |
|---|---|---|
| 6,761,321 B2 | 7/2004 | Takahashi |
| 2002/0043224 A1* | 4/2002 | Richter .................. 123/41.1 |
| 2002/0047050 A1* | 4/2002 | Leu et al. .................. 236/12.16 |
| 2005/0268866 A1* | 12/2005 | Finkbeiner et al. .......... 123/41.1 |
| 2009/0165735 A1* | 7/2009 | Auweder et al. ........... 123/41.09 |

\* cited by examiner

THERMOSTATIC VALVE ASSEMBLY

CROSS-REFERENCE TO RELATED APPLICATION

This application claims priority to British Patent Application No. 1115035.6, filed Aug. 23, 2011, which is incorporated herein by reference in its entirety.

TECHNICAL FIELD

The technical field relates to a thermostatic valve assembly in the cooling system of an internal combustion engine (ICE) provided with a radiator.

BACKGROUND

It is known that the combustion and the pollutants emission of an internal combustion engine get worse at cold. For a long time, to reduce the warm up time, the cooling system of an ICE is equipped with a thermostatic valve to exclude the radiator, so that the engine is not cooled until the water stored in it reaches a target temperature, e.g. a temperature around 90° C.

The functional core of known thermostatic valves generally used in the automotive field is a thermostatic expansion element, e.g., a wax element connected to a main valve plate via a piston and contrasted by a spring. The wax element must be always wet by warm water coming from the engine. Around the target temperature, the wax changes its status from solid to liquid expanding its volume as well, pushing on the piston and opening the valve. The spring keeps the valve closed until the target temperature is reached. To improve the behavior of the valve, it is known to use an electrical heater directly acting on the wax.

At the first opening of the thermostat, the water stored in the radiator is much colder with respect to the water circulating in the engine (up to $\Delta t > 110°$ C.). Consequently, when the cold water from the radiator hits the wax element, the thermostat starts to close very quickly. The consecutive increase of temperature due to the hot water from the engine induces the thermostat to a new opening, so that cold water starts to flow again in the engine. This instable behavior of the thermostat causes a temperature instability until the achievement of a thermal steady state.

At least one object herein is to provide a thermostatic valve assembly that reduces, or even prevents, the temperature instability of the cooling fluid in the cooling system of an internal combustion engine when the thermostatic valve assembly starts to open.

Another object is to provide a thermostatic valve assembly that automatically controls sudden changes of temperature and pressure of the cooling fluid in the cooling system of an internal combustion engine. In addition, other objects, desirable features and characteristics will become apparent from the subsequent summary and detailed description, and the appended claims, taken in conjunction with the accompanying drawings and this background.

SUMMARY

According to an embodiment, the thermostatic valve assembly includes:
 a valve body having an inlet from the radiator, an inlet from the engine and an outlet to the engine;
 a main valve plate to open and close the pathway of the cooling fluid from the radiator;
 a wax element placed in a chamber of the valve body in fluid communication with the inlets and the outlet, the wax element having a piston mechanically connected to the main valve plate at its distal end;
 a main spring to keep the main valve plate closed until a target temperature of the cooling fluid coming from the engine is reached,
wherein an auxiliary valve plate is provided to open and close the direct pathway of the cooling fluid from the radiator to the chamber in which the wax element is placed.

This improves the thermostat behavior because, at the first opening of the main valve plate, the cold water coming from the radiator is prevented from directly contacting the wax element.

In an embodiment, a premixing channel is provided inside the valve body between the inlet from the engine and the inlet from the radiator. In this way the cold water coming from the radiator can be mixed with the warm water coming from the engine before contacting the wax element, thus avoiding sudden changes in the temperature of the cooling fluid that cause the thermal expansion/contraction of the wax.

The auxiliary valve plate is mounted on the piston of the wax element in an axially sliding condition; a hook is provided on the piston to move the auxiliary valve plate after a preset stroke of the piston. When the warm cooling fluid from the engine heats up the wax element, the main valve plate starts to open and a little amount of cold cooling fluid from the radiator flows through the premixing channel. As the temperature of the cooling fluid in the radiator begins to increase, the hook on the piston abuts the auxiliary valve plate to bring the same in an open condition, to allow a higher flow rate of cooling fluid to pass through the thermostatic valve assembly, and then to directly contact the wax element in order to cool down the engine.

According to an embodiment, the main valve plate consists of at least two parts that are axially movable with respect to each other in order to partially open the pathway of the cooling fluid from the radiator when the pressure in the radiator exceeds a preset value. This provides a built-in relief valve in the same thermostatic assembly in a limited space.

An auxiliary spring is mounted on the piston of the wax element between the auxiliary valve plate and one of the at least two parts of the main valve plate. This auxiliary spring has a double function, i.e., that of keeping the auxiliary valve plate in the closed position when the main valve plate is already open, but before the hook reaches the auxiliary valve plate, as well as that of contrasting the pressure of the cooling fluid on the movable part of the main valve plate.

An embodiment of the thermostatic valve assembly herein disclosed provides for an electrical heater directly acting on the wax element in order to have a further means to control the proper operation of the thermostatic valve assembly.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof Furthermore, there is no intention to be bound by any theory presented in the preceding background or the following detailed description.

Figure 1:
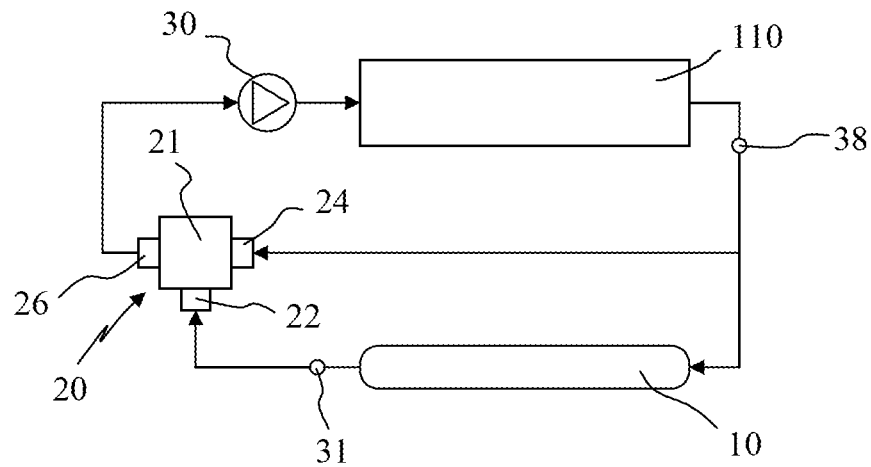
FIG. 1 is a simplified scheme of a cooling system of an internal combustion engine.

FIG. 1 shows a simplified scheme of an internal combustion engine 110 and its cooling system which includes a radiator 10, a thermostatic valve assembly 20, and a pump 30 for circulating the cooling fluid. A first temperature sensor 31 is placed at the exit of the radiator 10 to detect the temperature of the "cold" cooling fluid and a second temperature sensor 38 is placed at the exit of the engine 110 to detect the temperature of the "warm" cooling fluid.

Figure 2:
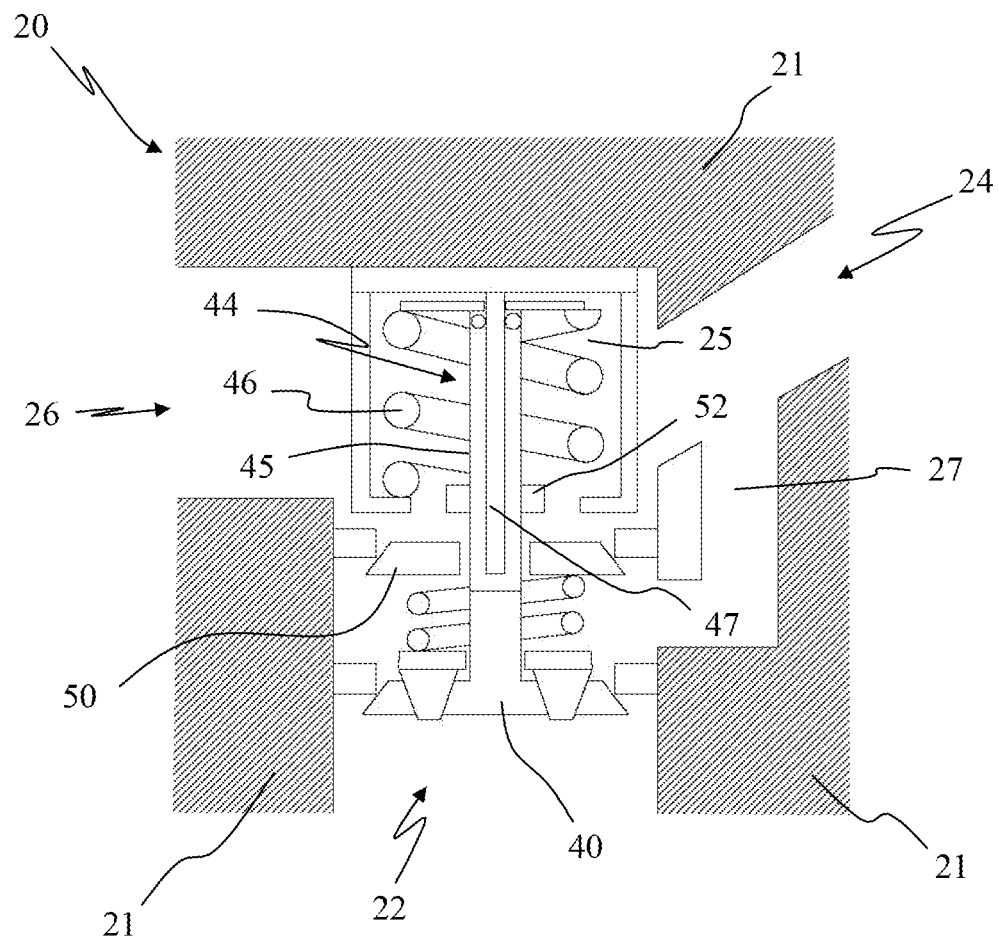
FIG. 2 is a schematic section view of an embodiment of a thermostatic valve assembly in the fully closed condition.

The thermostatic valve assembly 20 has a valve body 21 in which there are provided an inlet 22 from the radiator 10, an inlet 24 from the engine 110 and an outlet 26 to the engine. With reference to FIG. 2, the thermostatic valve assembly 20 has a main valve plate 40 to open and close the pathway of the cooling fluid which is received through the inlet 22 from the radiator 10.

In an embodiment, a wax element 44 is placed inside the valve body 21, namely in a chamber 25 that is in fluid communication with the inlets 22, 24, and the outlet 26. The wax element 44 has a piston 45 mechanically connected to the main valve plate 40 at its distal end. A main spring 46 keeps the main valve plate 40 in the closed position until a target temperature of the cooling fluid coming from the engine 110 is reached.

In another embodiment, an auxiliary valve plate 50 is also provided to open and close the direct flux of the cooling fluid from the radiator 10 into the chamber 25 where the wax element 44 is placed. The auxiliary valve plate 50 is mounted on the piston 45 in an axially sliding condition; a hook 52 is provided on the piston 45 to move the auxiliary valve plate only after a preset stroke of the piston 45.

A premixing channel 27 is provided inside the valve body 21 between the inlet 22 from the radiator 10 and the inlet 24 from the engine 110, according to another embodiment.

An electrical heater 47 directly acting on the wax element 44 can also be provided as a further control means to cause the expansion of the wax in the wax element 44.

The thermostatic valve assembly 20 of FIG. 2 is shown in its fully closed condition, in which both valve plates 40 and 50 are closed, for example at the start of the engine 110, and only the cooling fluid from the engine crosses the chamber 25 housing the wax element 44 and exits from the outlet 26.

Figure 3:
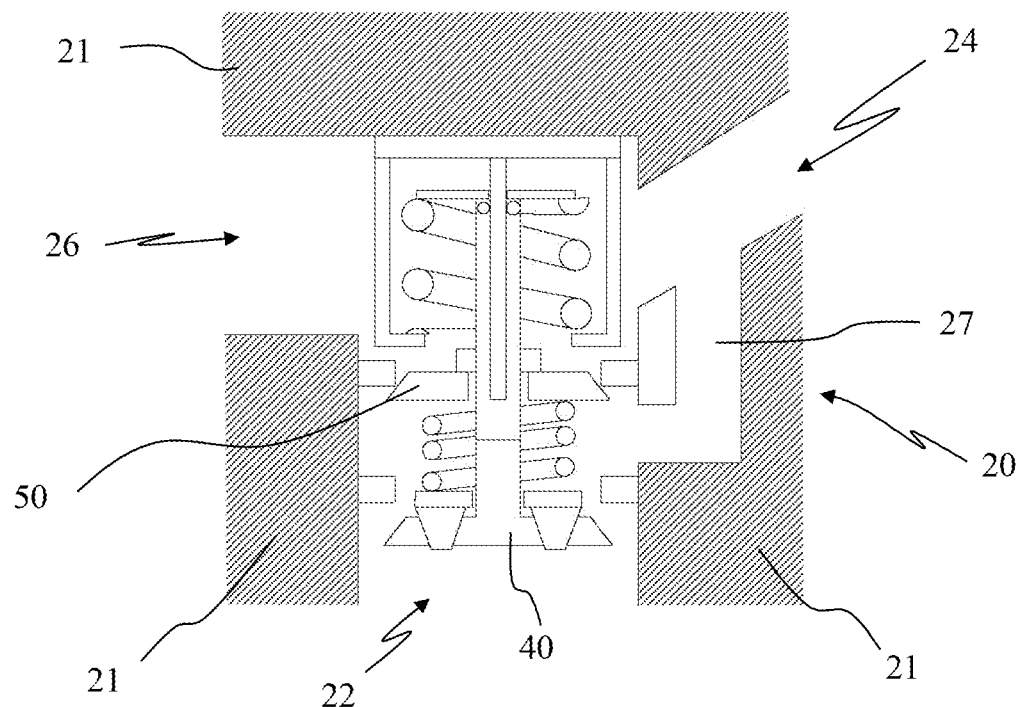
FIG. 3 is a schematic section view of the thermostatic valve assembly of FIG. 2 in a partially open condition.

As the engine warms up, the warm flow from the engine causes the thermal expansion of the wax in the wax element 44. As shown in FIG. 3, the main valve plate 40 starts to open and a limited flux of cooling fluid flows through the inlet 22 from the radiator 10 and enters the premixing channel 27 so that it mixes itself with warm cooling fluid coming from the engine 110 through the inlet 24. In this way, the temperature on the wax element 44 inside the chamber 25 does not collapse and the main valve plate 40 remains in the open condition. Indeed, the temperature of cold cooling fluid from the radiator is very low, but the flow rate to cool down the engine 110 is low as well.

Figure 4:
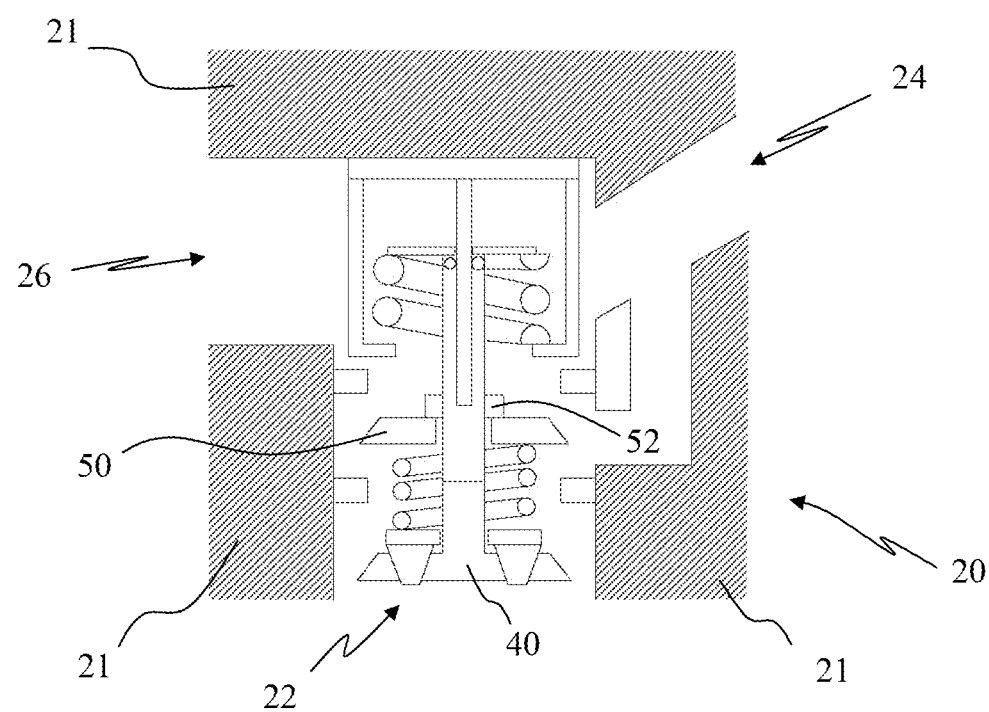
FIG. 4 is a schematic section view of the thermostatic valve assembly of FIG. 2 in the fully open condition.

When the temperature of the cooling fluid in the radiator 10 begin to increase, a higher flow rate is necessary to cool down the engine 110. In this case, shown in FIG. 4, the further thermal expansion of the wax in the wax element 44 causes the hook 52 to abut against the auxiliary valve plate 50 and bring the same in the open condition. The flux of cold cooling fluid from the radiator 10 enters directly in the chamber 25 and is mixed to the warm cooling fluid from the engine 110.

Figure 5:
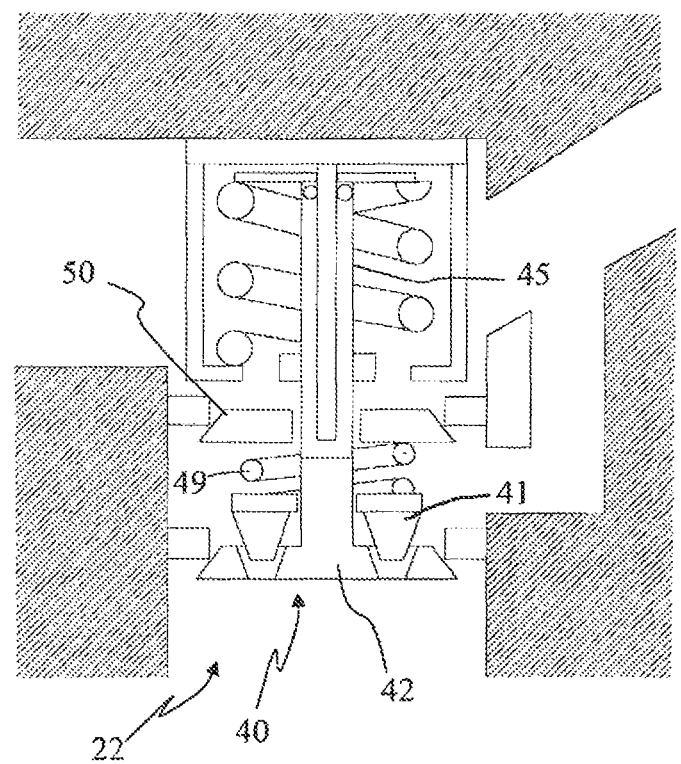
FIG. 5 is a schematic section view of the thermostatic valve assembly of FIG. 2 in closed condition but with the pressure relief valve in the open condition.

FIG. 5 shows another embodiment herein disclosed. The main valve plate 40 consists of two parts 41 and 42, i.e. a first part 41 that is axially movable with respect to a second part 42 connected to the piston 45. An auxiliary spring 49 keeps coupled the two parts 41 and 42 in the normally closed condition (as shown for example in FIGS. 2 to 4). In case the pressure of the cooling fluid reaches a too high value in the radiator 10, the parts 41, 42 and the auxiliary spring 49 act as a relief valve to allow a little flow of cooling fluid through the thermostatic valve assembly 20 that decreases the pressure value in the radiator 10. Even in this case, the cold cooling fluid from the radiator is forced to pass through the premixing channel 27—the auxiliary valve plate 50 remains closed—thus avoiding an overcooling effect on the wax element 44.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

What is claimed is:

1. A thermostatic valve assembly for a cooling system of an internal combustion engine provided with a radiator, the thermostatic valve assembly comprising:
    a valve body having an inlet from the radiator, an inlet from the internal combustion engine and an outlet to the internal combustion engine;
    a main valve plate to open and close a pathway of a cooling fluid from the radiator;
    a wax element that is held in a chamber of the valve body, wherein the chamber is in fluid communication with the inlets and the outlet, and wherein the wax element has a piston mechanically connected to the main valve plate at a distal end
    a main spring disposed above an auxiliary valve plate such that the auxiliary valve plate is disposed between the main valve plate and the main spring to keep the main valve plate closed until a target temperature of the cooling fluid coming from the internal combustion engine is reached,
    wherein the auxiliary valve plate is configured to open and close a direct pathway of the cooling fluid from the radiator to the chamber in which the wax element is held.

2. The thermostatic valve assembly according to claim 1, further comprising a premixing channel inside the valve body between the inlet from the internal combustion engine and the inlet from the radiator.

3. The thermostatic valve assembly according to claim 1, wherein the auxiliary valve plate is mounted on the piston of the wax element in axially sliding condition, and wherein a hook is positioned on the piston to move the auxiliary valve plate after a preset stroke of the piston.

4. The thermostatic valve assembly according to claim 1, wherein the main valve plate comprises at least two parts that are axially movable with respect to each other in order to partially open the direct pathway of the cooling fluid from the radiator when a pressure in the radiator exceeds a preset value.

5. The thermostatic valve assembly according to claim 4, wherein an auxiliary spring is mounted on the piston of the wax element between the auxiliary valve plate and one of the at least two parts of the main valve plate.

6. The thermostatic valve assembly according to claim 1, further comprising an electrical heater directly acting on the wax element.

7. The thermostatic valve assembly according to claim 1, wherein the main spring is disposed in the chamber that holds the wax element and the wax element is located in the chamber that encompasses the main spring.

8. An internal combustion engine with a cooling system that includes a radiator, a pump for circulating a cooling fluid, and a thermostatic valve assembly comprising:
- a valve body having an inlet from the radiator, an inlet from the internal combustion engine, and an outlet to the internal combustion engine;
- a main valve plate to open and close a pathway of the cooling fluid from the radiator;
- a wax element that is held in a chamber of the valve body, wherein the chamber is in fluid communication with the inlets and the outlet, and wherein the wax element has a piston mechanically connected to the main valve plate at a distal end
- a main spring disposed above an auxiliary valve plate such that the auxiliary valve plate is disposed between the main valve late and the main spring to keep the main valve plate closed until a target temperature of the cooling fluid coming from the internal combustion engine is reached,
- wherein the auxiliary valve plate is configured to open and close a direct pathway of the cooling fluid from the radiator to the chamber in which the wax element is held.

9. The internal combustion engine of claim 8, further comprising a premixing channel inside the valve body between the inlet from the internal combustion engine and the inlet from the radiator.

10. The internal combustion engine of claim 8, wherein the auxiliary valve plate is mounted on the piston of the wax element in axially sliding condition, and wherein a hook is positioned on the piston to move the auxiliary valve plate after a preset stroke of the piston.

11. The internal combustion engine of claim 8, wherein the main valve plate comprises at least two parts that are axially movable with respect to each other in order to partially open the direct pathway of the cooling fluid from the radiator when a pressure in the radiator exceeds a preset value.

12. The internal combustion engine of claim 11, further comprising an auxiliary spring mounted on the piston of the wax element between the auxiliary valve plate and one of the at least two parts of the main valve plate.

13. The internal combustion engine of claim 8, further comprising an electrical heater directly acting on the wax element.

14. The internal combustion engine of claim 8, wherein the main spring is disposed in the chamber that holds the wax element and the wax element is located in the chamber that encompasses the main spring.

\* \* \* \* \*